United States Patent
Aweya et al.

(10) Patent No.: US 8,959,381 B2
(45) Date of Patent: Feb. 17, 2015

(54) METHOD AND SYSTEM FOR CLOCK OFFSET AND SKEW ESTIMATION

(75) Inventors: James Aweya, Abu Dhabi (AE); Nayef AlSindi, Abu Dhabi (AE)

(73) Assignees: Khalifa University of Science, Technology, and Research, Abu Dhabi (AE); British Telecommunications plc, London (GB); Emirates Telecommunications Corporation, Abu Dhabi (AE)

( * ) Notice: Subject to any disclaimer, the term of this patent is extended or adjusted under 35 U.S.C. 154(b) by 220 days.

(21) Appl. No.: 13/603,977

(22) Filed: Sep. 5, 2012

(65) Prior Publication Data

US 2014/0068315 A1    Mar. 6, 2014

(51) Int. Cl.
- G06F 1/04    (2006.01)
- G06F 1/00    (2006.01)
- G06F 15/16   (2006.01)
- G06F 1/14    (2006.01)

(52) U.S. Cl.
CPC ... G06F 1/04 (2013.01); G06F 1/14 (2013.01)
USPC ............ 713/503; 713/500; 709/203; 709/230

(58) Field of Classification Search
CPC ..................................... G06F 1/04; G06F 1/14
USPC .......................... 713/500, 503; 709/203, 230
See application file for complete search history.

(56) References Cited

U.S. PATENT DOCUMENTS

| | | | |
|---|---|---|---|
| 6,327,274 B1 | 12/2001 | Ravikanth | |
| 6,661,810 B1 | 12/2003 | Skelly et al. | |
| 6,957,357 B2 | 10/2005 | Liu et al. | |
| 7,051,246 B2 | 5/2006 | Benesty | |
| 7,103,124 B1 | 9/2006 | Lindskog et al. | |
| 7,454,648 B2 * | 11/2008 | Dahlen et al. | 713/500 |
| 7,475,272 B2 * | 1/2009 | Carlson et al. | 713/503 |
| 7,688,865 B2 | 3/2010 | Carlson et al. | |
| 7,865,331 B2 * | 1/2011 | Dzung et al. | 702/176 |
| 7,912,164 B2 | 3/2011 | Armstrong et al. | |
| 7,936,794 B2 * | 5/2011 | Gibbons et al. | 370/516 |
| 8,108,558 B2 | 1/2012 | Kirsch et al. | |
| 8,363,769 B2 | 1/2013 | Kondo | |
| 8,738,792 B2 * | 5/2014 | Carlson et al. | 709/230 |

FOREIGN PATENT DOCUMENTS

EP    0697774    2/1996

OTHER PUBLICATIONS

International Search Report dated Jun. 24, 2013 for International Application No. PCT/GB2012/052173.
Written Opinion dated Jun. 24, 2013 for International Application No. PCT/GB2012/052173.

(Continued)

Primary Examiner — Stefan Stoynov
(74) Attorney, Agent, or Firm — Calfee, Halter & Griswold LLP

(57) ABSTRACT

This invention relates to methods and devices for clock offset and skew estimation. The invention has particular application in the alignment of slave clocks to a master clock. In embodiments of the invention, the slave clock employs an independent free running clock and a recursive estimation technique to estimate the clock offset and clock skew between the slave and master clocks. The slave can then use the offset and skew to correct the free running clock to reflect an accurate image of the master clock.

11 Claims, 7 Drawing Sheets

(56) References Cited

OTHER PUBLICATIONS

IEEE Standard for a Precision Clock Synchronization Protocol for Networked Measurement and Control Systems, IEEE 1588-2008.
IEEE Standard for a Precision Clock Synchronization Protocol for Networked Measurement and Control Systems, IEEE 1588-2002.
Mills, D., "Network Time Protocol (Version 3) Specification, Implementation and Analysis", IETF RFC 1305, Mar. 1992.
R. Holler, T. Saulter, N. Kero, "Embedded SynUTC and IEEE 1588 clock synchronization for industrial Ethernet," in Proc. IEEE Emerging Technologies and Factory Automation, vol. 1, pp. 422-426, Nov. 2003.
O. Gurewitz, I. Cidon and M. Sidi, "Network time synchronization using clock offset optimization," in Proc. IEEE Int'l Conf. on Network Protocols, pp. 212-221, Nov. 2003.
R. Subrahmanyan, "Timing recovery for IEEE 1588 applications in telecommunications," IEEE Transactions on Inst. And Meas., vol. 58, No. 6, pp. 1858-1868, Jun. 2009.
I. Hadzic, D.R. Morgan and Z. Sayeed, "A synchronization algorithm for packet MANs," IEEE Transactions on Communications, vol. 59, No. 4, pp. 1142-1153, Apr. 2011.
V. Paxon, Measurements and Analysis of End-to-End Internet Dynamics, Ph.D. Thesis, University of California, Berkeley, 1997.
S. B. Moon, P. Skelly and D. Towsley, "Estimation and removal of clock skew from network delay measurements," in Proc. IEEE Infocom, vol. 1, pp. 227-234, New York, NY, USA, Mar. 1999.
L. Zhang, Z. Liu and C. H. Xia, "Clock synchronization algorithms for network measurements," in Proc. IEEE Infocom, vol. 1, pp. 160-169, Nov. 2002.
A. Bletsas, "Evaluation of Kalman filtering for network time keeping," IEEE Transactions on Ultrasonics, Ferroelectrics and Frequency Control, vol. 52, No. 9, pp. 1452-1460, Sep. 2005.
L. F. Auler and R. d'Amore, "Adaptive Kalman Filter for time synchronization over packet-switched networks—an heuristic approach," in Proc. 2nd Int'l Conf. on Communication Systems Software and Middleware, pp. 1-7, Bangalore, Jan. 2007.
H. Abubakari and S. Sastry, "IEEE 1588 style synchronization over wireless link," in Proc. IEEE ISPCS, Ann Arbor, MI, pp. 127-130, Sep. 2008.
Z. Yang, J. Pan, L. Cai, "Adaptive clock skew estimation with interactive multi-modal Kalman filters for sensor networks," in Proc. IEEE Int'l Conf. on Commun. (ICC), pp. 1-5, Cape Town, South Africa, May 2010.
G. Giorgi and C. Narduzzi, "Performance analysis of Kalman-Filter-Based clock synchronization in IEEE 1588 networks," IEEE Transactions on Instrumentation and Measurement, vol. 60, No. 8, pp. 2902-2909, Aug. 2011.
H. Kim, X. Ma, B.R. Hamilton, "Tracking low-precision clocks with time-varying drifts using Kalman filtering," IEEE/ACM Transactions on Networking, vol. 99, Jun. 2011.
P. Wolfrum, R. L. Scheiterer, and D. Obradovic, "An Optimal Control Approach to Clock Synchronization," ISPCS 2010, Sep. 27-Oct. 1, 2010 pp. 122-128.
D. Fontanelli and D. Macii, "Accurate Time Synchronization in PTP-based Industrial Networks with Long Linear Paths," ISPCS 2010, Sep. 27-Oct. 1, 2010 pp. 97-102.

\* cited by examiner

METHOD AND SYSTEM FOR CLOCK OFFSET AND SKEW ESTIMATION

FIELD OF THE INVENTION

The present invention relates to a method and system for clock offset and skew estimation. It is particularly, but not exclusively, concerned with the alignment of slave clocks to a master clock.

BACKGROUND OF THE INVENTION

IEEE 1588 Precision Time Protocol (PTP) [1][2] is the industry accepted protocol for transferring time information over packet networks. PTP is designed as an improvement to the current version of the Network Time Protocol (NTP) [3]. There are a number of works cited in the literature that describe clock synchronization using the Kalman filter technique. Many of these works [16-27] are mostly academic and do not show how the clock synchronization (correction) is implemented and how the slave clock behaves.

Basic Definitions

Clock Offset: The clock offset at a particular moment is the difference between the time reported by the time client (slave) and the "true" time as reported by the time server (master).

Clock Skew: A clock's skew at a particular moment is the frequency difference (first derivative of its offset with respect to true time) between the client clock and the server clock.

Clock synchronization has received considerable attention over the last several years as the communication networks evolve from circuit-switched to all-IP packet based networks. With this migration the challenge of frequency and time synchronization has surfaced. The techniques in the state of the art differ by the assumed model and the estimated parameters.

The first group assumes that the two clocks differ by an offset. As a result the algorithms and techniques attempt to estimate only the offset between the clocks. The reality is far from this model, however, and as a result the second group adopts a more realistic model where the clocks differ by an offset and a skew. The skew is assumed constant in the duration of the estimation process. In order to achieve robust and accurate synchronization, advanced algorithms are needed that estimate the offset and skew simultaneously.

Clock synchronization over packet networks (LANs) but with the offset only assumption has been proposed in [4] and [5]. The former implements offset estimation using IEEE 1588 protocol which is more accurate than the latter that uses the Network Time Protocol (NTP) which is software-based, inaccurate time-stamping method.

The importance of clock synchronization in telecommunication networks has been highlighted in [6] where a phase control loop has been proposed using the IEEE 1588 PTP protocol to estimate the offset. Another recent offset-only clock synchronization algorithm has been proposed in [7] which follows [6] in concept where the PTP algorithm is used as the time-stamp exchange mechanism and a PLL is implemented to estimate the offset. In addition the authors propose noise reduction mechanisms to deal with Packet Delay Variation (PDV) noise typically experienced in packet networks.

The problem with all these techniques is the non-realistic assumption that the two clocks differ only by an offset. The reality however is that the slave clock, in addition to the offset, deviates in time as well due the skew problem which is an inherent problem with most clocks. As a result, in order to enable robust and accurate synchronization, both the offset and the skew should be estimated.

There are several techniques that propose clock synchronization algorithms to estimate the skew through linear regression or linear programming techniques and convex hull methods.

Specifically, [8] proposes a median line-fitting technique which is a robust line-fitting technique. The problem with line-regression algorithms is that they are usually not robust to presence of large outliers and thus the robustness is only valid for certain PDV models (e.g. Gaussian).

In [9] a simple skew and offset estimation method is proposed where timestamps are used to compute the average jitter and average inter-packet arrival time. Then the relative skew is computed as the ratio of the average jitter to the average inter-packet time.

A more complicated approach is proposed in [10] [11] where a linear programming technique is used to estimate the clock skew in network delay measurements. The technique shows improvement in performance compared to other existing algorithms.

In [12], [13] skew estimation is achieved through the computation of convex hull from the delay measurements. The authors claim that convex-hull approach provides better insight and handling of error metrics compared to linear regression or linear programming techniques. Although the technique was tested using NTP, it can be implemented with any protocol (such as IEEE 1588) that captures the delay measurements.

An extension of this technique is introduced by [14] where both the offsets and skew are estimated by a lower and upper convex hull approach that relies on using forward/backward delay measurements.

An adaptive approach to estimating the clock skew was proposed in [15] where a recursive least squares approach is used to calculate an estimate of the clock skew.

One major drawback of these techniques is that they have been developed using NTP messaging mechanisms which does not have high accuracy. For very precise clock synchronization applications such as synchronizing TDD base stations over packet network a more robust approach is required that integrates IEEE 1588 protocol.

All these techniques follow a "batch" approach to skew and/or offset estimation and as such can be computationally expensive. An alternative approach to skew and offset estimation can be achieved by observing the recursive nature of time-stamping and delay measurements which provide an opportunity for implementing recursive optimal filters such as the Kalman filter.

The implementation of Kalman Filter for clock synchronization using NTP was proposed in [16] and compared to existing techniques such as linear programming and statistical averaging.

In [17], estimating the frequency deviation in clocks to synchronize radio base stations in packet based network using time-tamping and Kalman filtering approach is proposed. The method estimates the frequency error (skew) and the frequency drift over time and does not estimate the time offset which is very important for accurate synchronization.

A heuristic approach to time synchronization over NTP packet networks using Kalman Filter was proposed and evaluated [18].

A Kalman Filter skew only clock synchronization using IEEE 1588 over wireless links was proposed in [19] which has limitations due to ignoring the offset component.

A circuit design for implementing clock synchronization using a Kalman filter approach is proposed in [20].

A technique to estimate the clock/time deviations based on the implementation of a Kalman filter on a smooth sequence of measured beacon intervals was proposed in [21]. The technique is mainly implemented for rovers in motion and as a result the state equations for the Kalman filter involve components that model the dynamicity. In addition the technique proposes to estimate pseudo ranges or distances at the same time which can be used to localize the rovers.

An Interactive Multi-Modal (IMM) Kalman filter clock synchronization technique was proposed in [22] where the time-varying clock state vector was estimated for different environments for wireless sensor networks.

Clock synchronization (skew and offset) using a Kalman filter has been proposed for wireless sensor networks (WSN) where nodes synchronize to a master node (master clock) through packet transmission across the network [23].

Detailed performance analysis of Kalman-Filter based clock synchronization using IEEE 1588 protocol was presented in [24] where both the skew and offset were modeled and estimated.

An algorithm to track clock offset and skew using a Kalman Filter in networks that lack high-accuracy oscillators or programmable network interfaces was proposed in [25]. High synchronization accuracy was demonstrated through extensive simulations and real clock oscillator measurements.

IEEE 1588 Precision Timing Protocol (PTP)

IEEE 1588 PTP was defined [1][2] to synchronize distributed clocks across Ethernet and other packet based networks. It allows for synchronization of distributed clocks to sub-microsecond accuracy. IEEE 1588 PTP was designed as an improvement to current time synchronization technologies such as the Network Time Protocol (NTP) [3]. NTP allows for synchronization of distributed clocks to a precision in the order of hundreds of microseconds or milliseconds, which for many applications such as personal computer use is a sufficient level of accuracy. IEEE 1588 PTP, which is now the industry accepted standard for synchronization, grew out of the need for greater accuracy synchronization over packet networks, particularly Ethernet.

IEEE 1588 PTP relies on the use of hardware timestamped messages to synchronize one or more slave clocks (time client) to a master clock (time server). This process involves a message transaction between the master and slave where the precise moments of transmit and receive are measured, preferably at the hardware level. Accurate time information is distributed hierarchically, with a grandmaster clock at the root of the hierarchy. The grandmaster provides the time reference for one or more slave devices. These slave devices can, in turn, act as master devices for further hierarchical layers of slave devices.

IEEE 1588 PTP also defines the descriptors that characterize a clock, the states of a clock and the allowed state transitions. The standard defines network messages, fields and semantics, the datasets maintained by each clock and the actions and timing for all IEEE 1588 network and internal events. In addition, the standard describes a suite of messages used for monitoring the system, specifications for an Ethernet-based implementation and conformance requirements and some implementation suggestions.

IEEE 1588 PTP relies on the transfer of PTP messages to determine clock and system properties and to convey time information. A delay measurement process is used to determine path delays, which are then accounted for in the adjustment of local clocks. At system start up, a master/slave hierarchy is created using the Best Master Clock (BMC) algorithm [1] to determine which clock has the highest quality clock (grandmaster clock) within the network. The BMC algorithm is then run continuously to allow clocks to adjust quickly to changes in network configuration and status. If the grandmaster clock is removed from the network or is determined by the BMC algorithm to no longer be the highest quality clock, the algorithm then redefines what the new grandmaster clock is and all other clocks are adjusted accordingly.

Synchronization with IEEE 1588 PTP is achieved using a series of message transactions between a master and its slaves. FIG. 1 shows the message flow process for a strictly peer-to-peer message transaction scenario. This figure illustrates the case where the master clock in a time server 10 is directly attached (or peered) to a slave clock in a time client 14 over a packet network 12. The slave clock derives its timing from the upstream master clock and then acts as a master clock for further downstream devices. The main time synchronization related message types for this exchange involve the Sync, Follow_Up, Delay-Req, and Delay_Resp messages. Other more complex message flow process where message traverse intermediate nodes are described in the IEEE 1588 PTP standard.

In FIG. 1, the master sends a Sync message to the slave and notes the time, $T_1$, at which it was sent. The slave receives the Sync message and notes the time of reception, $T_2$. The master conveys to the slave the timestamp $T_1$ by either embedding the timestamp $T_1$ in the Sync message (i.e., one-step clock mode which requires some sort of hardware processing for embedding the timestamp on-the-fly for highest accuracy and precision), or embedding the timestamp $T_1$ in a Follow_Up message (i.e., two-step clock mode). The slave sends a Delay_Req message to the master and notes the time, $T_3$ at which it was sent. The master receives the Delay_Req message and notes the time of reception, $T_4$. The master conveys to the slave the timestamp $T_4$ by embedding it in a Delay_Resp message. The use of Follow_Up messages eliminates the need to timestamp transmitted messages on the fly, thereby facilitating a simpler hardware implementation.

After this message exchange the slave will have four timestamps $\{T_1, T_2, T_3, T_4\}$ from which it can determined both the network delay, d (the time taken for messages to traverse the network link between the two nodes) and the slave offset, $\theta$, (time offset by which the slave clock leads or lags the master). Messages containing current time information are adjusted to account for their path delay, therefore providing a more accurate representation of the time information conveyed.

$$T_2 = T_1 + \theta + d \tag{1}$$

$$T_3 = T_4 + \theta - d \tag{2}$$

Under the assumption that the delays for the two paths are symmetric (the delay in one direction is the same as the delay in the opposite direction), the following relationships can be derived (see FIG. 1):

$$\hat{d} = \frac{(T_2 - T_1) + (T_4 - T_3)}{2} \tag{3}$$

$$\theta = \frac{(T_2 - T_1) - (T_4 - T_3)}{2} \tag{4}$$

The clock offset $\theta$ can be used to align the local clock to the master's. A key assumption here is that the message exchanges occur over a period of time so small that the offset $\theta$ can be assumed constant over that period. In addition, the accuracy of this link delay measurement depends on both the symmetry of the one-way link delays and the accuracy of the timestamping process. A master clock device synchronizes the attached slave clock devices through the use of periodic Sync and Follow_Up messages. The slave clock devices use the information captured in these messages to perform periodic adjustments to their local clock.

A complete IEEE 1588-based solution at a time client 14 includes servo algorithms, filters, a PTP-Clock based on hardware timer and direct timer access. IEEE 1588 defines a wide range of synchronization capabilities except the clock synchronization mechanisms (servo algorithm, PLL, timers, etc.) to be used at the receiver (slave) to synchronize its local clock to the master. Methods of clock adjustment implementation are not specified by IEEE 1588; it only provides a standard protocol for the exchange of messages between clocks. The benefit of not specifying clock adjustment implementations, is to allow clocks from different manufactures to be able to synchronize with each other as long as they understand the messaging protocol.

There are a number of factors that can cause two supposedly identical clocks to drift apart or lose synchronization. Differences in temperature, the age of the oscillators themselves, manufacturing defects and material variations in the manufacturing process, and electric and magnetic interference, among other factors, can all affect the quality of synchronization.

Even the smallest errors in keeping time can significantly add up over a long period. If a clock frequency (skew) is off by just 10 parts per million (ppm), it will gain or lose almost a second a day (i.e., $24 \times 60 \times 60/10^5 = 0.86$ s/day). All of these factors create a need for clock synchronization to allow for two clocks to be aligned when differences occur. The continuous variations of the above factors also explain why the process of synchronization is a continuous and not a one-time process. Clearly, having any sort of meaningful time synchronization is almost impossible if clocks are allowed to run on their own without synchronization.

The above simple analysis shows that clock skew is the main reason why clocks drift apart and need to be aligned periodically. The analysis earlier on based on FIG. 1 assumes no clock system. Adjusting the clock skew in addition to the initial clock offset guarantees the long term reliability of the synchronization process. Critical applications like those enumerated above require higher synchronization accuracy and reliability.

An object of the present invention is to achieve accurate and robust synchronization, preferably over IEEE 1588, for critical applications that require stringent synchronization margins.

SUMMARY OF THE INVENTION

An exemplary aspect of the present invention provides a method of estimating the offset and skew of a local clock in a time client compared with a remote master clock in a time server, the method including the steps of: transmitting Sync and Delay_Req messages under the IEEE 1588 PTP, carrying timestamps from the time server; receiving said messages at the time client and recording the time of receipt according to the local clock and extracting said timestamps; and performing a recursive estimation using a Kalman filter process based on the extracted timestamps and the output of the local clock to estimate the offset and skew of the local clock compared to the master clock, wherein the Kalman filter is applied to: the measurement equation: $(T_{2,n}-T_{1,n})-(T_{4,n}-T_{3,n})=2\theta_n+\alpha_n(T_{1,n}+T_{4,n})+v_n$ wherein: $\theta_n$ and $\alpha_n$ are respectively the offset and the skew of the local clock at point n, $T_{1,n}$ is the timestamp applied by the time server to the nth Sync message; $T_{2,n}$ is the time of receipt as recorded by the local clock on receipt of the nth Sync message; $T_{3,n}$ is the timestamp applied by the time client to the nth Delay_Req message; $T_{4,n}$ is the time of receipt as recorded by the master clock on receipt of the nth Delay_Req message; and $v_n$ is the measurement noise which is assumed to be zero mean Gaussian white noise with covariance $R_n=E[v_n v_n^T]$, and to the two-state dynamic model defined by:

$$\begin{bmatrix} \theta_n \\ \alpha_n \end{bmatrix} = \begin{bmatrix} 1 & (T_{1,n}-T_{1,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix}$$

wherein: $T_{1,n}$ and $T_{1,n-1}$ are timestamps at points n and n−1 respectively; and $w_n^T=[w_{\theta,n} \; w_{\alpha,n}]$ is a process noise vector which is assumed to be drawn from a zero mean normal distribution with covariance $Q_n=E[w_n w_n^T]$.

A further exemplary aspect of the present invention provides a time client communicably coupled to a time server over a network, the time client comprising: a local clock; and a control unit, wherein the control unit is arranged to receive Sync and Delay_Req messages under the IEEE 1588 PTP carrying timestamps from the time server and to record the time of receipt of those messages according to the local clock and extract the timestamps, and to perform a recursive estimation using a Kalman filter process based on the extracted timestamps and the output of the local clock to estimate the offset and skew of the local clock compared to a clock in the time server, wherein the Kalman filter is applied to: the measurement equation: $(T_{2,n}-T_{1,n})-(T_{4,n}-T_{3,n})=2\theta_n+\alpha_n(T_{1,n}+T_{4,n})+v_n$, wherein: $\theta_n$ and $\alpha_n$ are respectively the offset and the skew of the local clock at point n, $T_{1,n}$ is the timestamp applied by the time server to the nth Sync message; $T_{2,n}$ is the time of receipt as recorded by the local clock on receipt of the nth Sync message; $T_{3,n}$ is the timestamp applied by the time client to the nth Delay_Req message; $T_{4,n}$ is the time of receipt as recorded by the master clock on receipt of the nth Delay_Req message; and $v_n$ is the measurement noise which is assumed to be zero mean Gaussian white noise with covariance $R_n=E[v_n v_n^T]$, and to the two-state dynamic model defined by:

$$\begin{bmatrix} \theta_n \\ \alpha_n \end{bmatrix} = \begin{bmatrix} 1 & (T_{1,n}-T_{1,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix}$$

wherein: $T_{1,n}$ and $T_{1,n-1}$ are timestamps at points n and n−1 respectively; and $w_n^T=[w_{\theta,n} \; w_{\alpha,n}]$ is a process noise vector which is assumed to be drawn from a zero mean normal distribution with covariance $Q_n=E[w_n w_n^T]$.

A further exemplary embodiment of the present invention provides a networked time system including a time server and at least one time client connected to the time server over a network, wherein: the time server includes a master clock and transmits Sync and Delay_Req messages under IEEE 1588 PTP carrying timestamps from the master clock; the time client includes a local clock and a control unit, wherein the control unit is arranged to receive the messages carrying timestamps from the time server and to record the time of receipt of those messages according to the local clock and to extract the timestamps, and to perform a recursive estimation using a Kalman filter process based on the extracted timestamps and the output of the local clock to estimate the offset and skew of the local clock compared to a clock in the time server, wherein the Kalman filter is applied to: the measurement equation: $(T_{2,n}-T_{1,n})-(T_{4,n}-T_{3,n})=2\theta_n+\alpha_n(T_{1,n}+T_{4,n})+v_n$, wherein: $\theta_n$ and $\alpha_n$ are respectively the offset and the skew of the local clock at point n, $T_{1,n}$ is the timestamp applied by the time server to the nth Sync message; $T_{2,n}$ is the time of receipt as recorded by the local clock on receipt of the nth Sync message; $T_{3,n}$ is the timestamp applied by the time client to the nth Delay_Req message; $T_{4,n}$ is the time of receipt as recorded by the master clock on receipt of the nth Delay_Req message; and $v_n$ is the measurement noise which is assumed to be zero mean Gaussian white noise with covariance $R_n=E[v_n v_n^T]$, and to the two-state dynamic model defined by:

$$\begin{bmatrix} \theta_n \\ \alpha_n \end{bmatrix} = \begin{bmatrix} 1 & (T_{1,n}-T_{1,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix}$$

wherein: $T_{1,n}$ and $T_{1,n-1}$ are timestamps at points n and n−1 respectively; and $w_n^T=[w_{\theta,n}\ w_{\alpha,n}]$ is a process noise vector which is assumed to be drawn from a zero mean normal distribution with covariance $Q_n=E[w_n w_n^T]$.

BRIEF DESCRIPTION OF THE DRAWINGS

Embodiments of the invention will now be described by way of example with reference to the accompanying drawings in which.

DETAILED DESCRIPTION

Figure 1:
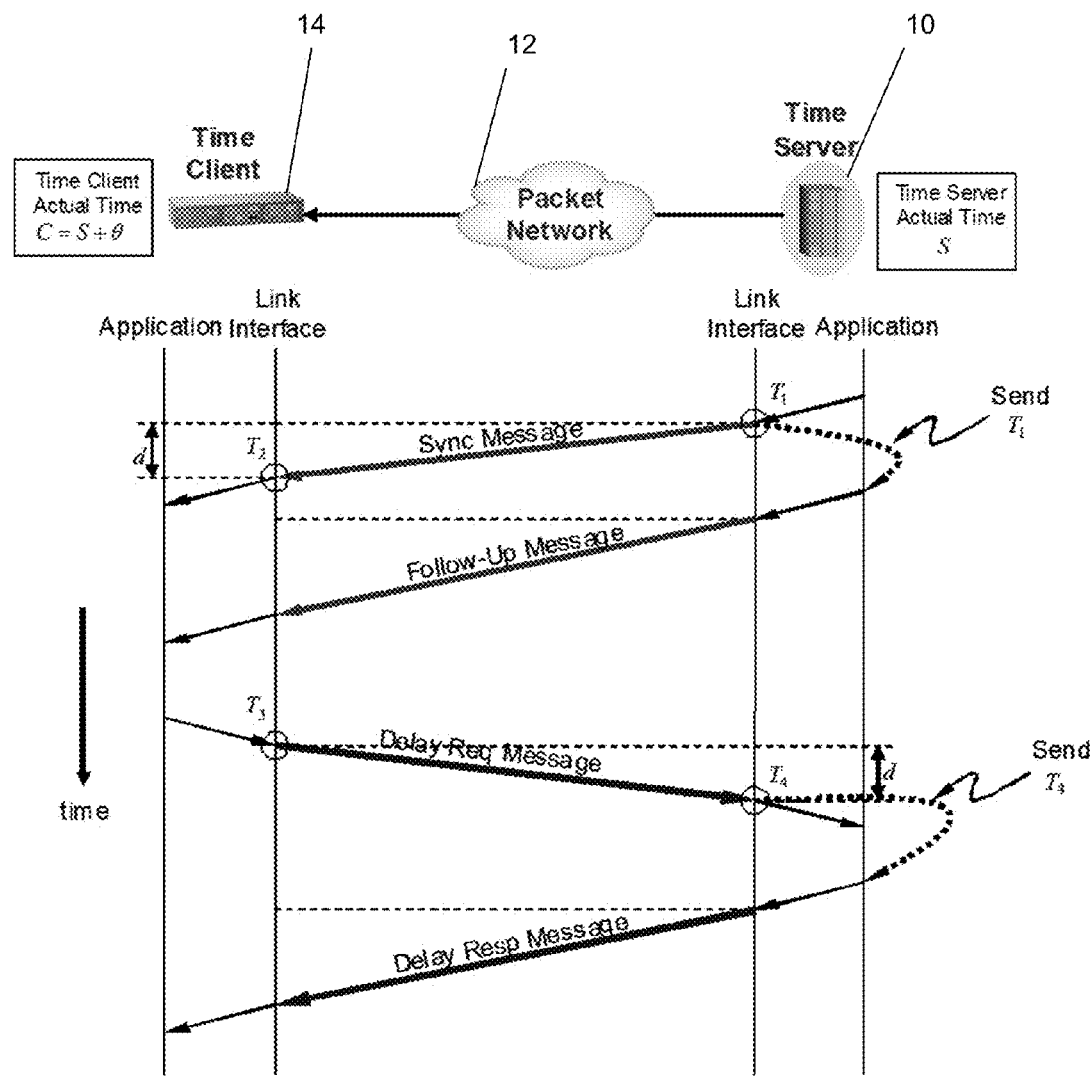
FIG. 1 shows a general overview of synchronization with IEEE 1588 PTP using a series of message transactions between a master and its slave(s) and has already been described.

Accordingly, at its broadest, a first aspect of the present invention provides a method of estimating the offset and skew of a local clock using a recursive estimation technique.

A first aspect of the present invention preferably provides a method of estimating the offset and skew of a local clock in a time client compared with a remote master clock in a time server, the method including the steps of:

transmitting Sync and Delay_Req messages under the IEEE 1588 PTP, carrying timestamps from the time server;

receiving said messages at the time client and recording the time of receipt according to the local clock and extracting said timestamps; and performing a recursive estimation using a Kalman filter process based on the extracted timestamps and the output of the local clock to estimate the offset and skew of the local clock compared to the master clock, wherein the Kalman filter is applied to:

the measurement equation:

$(T_{2,n}-T_{1,n})-(T_{4,n}-T_{3,n})=2\theta_n+\alpha_n(T_{1,n}+T_{4,n})+v_n$ wherein:

$\theta_n$ and $\alpha_n$ are respectively the offset and the skew of the local clock at point n, $T_{1,n}$ is the timestamp applied by the time server to the nth Sync message;

$T_{2,n}$ is the time of receipt as recorded by the local clock on receipt of the nth Sync message;

$T_{3,n}$ is the timestamp applied by the time client to the nth Delay_Req message;

$T_{4,n}$ is the time of receipt as recorded by the master clock on receipt of the nth Delay_Req message; and $v_n$ is the measurement noise which is assumed to be zero mean Gaussian white noise with covariance $R_n=E[v_n v_n^T]$, and to the two-state dynamic model defined by:

$$\begin{bmatrix} \theta_n \\ \alpha_n \end{bmatrix} = \begin{bmatrix} 1 & (T_{1,n}-T_{1,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix}$$

wherein:

$T_{1,n}$ and $T_{1,n-1}$ are timestamps at points n and n−1 respectively; and $w_n^T=[w_{\theta,n}\ w_{\alpha,n}]$ is a process noise vector which is assumed to be drawn from a zero mean normal distribution with covariance $Q_n=E[w_n w_n^T]$.

By estimating the offset and the skew of the local clock, an accurate estimate of the master clock can be arrived at. Preferably the method further includes the step of adjusting the output of the local clock by applying the estimated offset and skew to produce a clock output that is synchronised with the master clock.

The recursive estimation employs a Kalman filter process. As a Kalman filter works using a "predict phase" in which the current state of the system is predicted and an "update phase" when the predicted system state is updated based on the latest information provided, the Kalman filter operates recursively and only the last estimate of each of the offset and skew are required in order to calculate the current estimated values. This reduces the complexity and calculation cost of the estimation compared to a method in which historical data is required to provide an estimate of the current values (such as a least squares approach). However, because each estimate can effectively include the estimation based on previous inputs and measurements, the estimate produced can be very accurate.

A Kalman filter typically averages a prediction of a system's state with a new measurement using a weighted average. The weights are assigned in such a way that values with better (i.e. smaller) estimate uncertainty are considered more "trusted". The result of the weighted average can therefore be a new state that lies between the predicted and the measured state and has a better estimated uncertainty than either of these values alone.

The messages used to transmit timestamps from the time server to the time client are IEEE 1588 PTP messages. The PTP provides a protocol under which a standard message exchange is conducted between a master and a slave clock. The use of PTP means that it is not necessary to make any changes to the time server in order to implement the method of this aspect, as the changes can be confined to the configuration of the time client and the estimation carried out locally based on the timestamps received in the standard PTP messages.

Under the IEEE 1588 PTP, message exchanges are performed regularly between server and client. The method of this aspect preferably further includes repeatedly estimating the offset and skew on a periodic basis, for example every time a particular message (such as a Sync message) is received, or after a predetermined number of messages have been received.

Embodiments of this first aspect may include some, all or none of the above described optional or preferred features.

The method of the first aspect is preferably, but not necessarily, used to control a time client according to the second aspect below or a time system according to the third aspect below, including some, all or none of the optional or preferred features of those aspects.

At its broadest, a second aspect of the present invention provides a time client which is able to estimate the offset and skew of its local clock using a recursive estimation technique.

Accordingly a second aspect of the present invention preferably provides a time client communicably coupled to a time server over a network, the time client comprising: a local clock; and a control unit, wherein the control unit is arranged to receive Sync and Delay_Req messages under the IEEE 1588 PTP carrying timestamps from the time server and to record the time of receipt of those messages according to the local clock and extract the timestamps, and to perform a recursive estimation using a Kalman filter process based on the extracted timestamps and the output of the local clock to estimate the offset and skew of the local clock compared to a clock in the time server, wherein the Kalman filter is applied to: the measurement equation: $(T_{2,n}-T_{1,n})-(T_{4,n}-T_{3,n})=2\theta_n+\alpha_n(T_{1,n}+T_{4,n})+v_n$, wherein: $\theta_n$ and $\alpha_n$ are respectively the offset and the skew of the local clock at point n, $T_{1,n}$ is the timestamp applied by the time server to the nth Sync message; $T_{2,n}$ is the time of receipt as recorded by the local clock on receipt of the nth Sync message; $T_{3,n}$ is the timestamp applied by the time client to the nth Delay_Req message; $T_{4,n}$ is the time of receipt as recorded by the master clock on receipt of the nth Delay_Req message; and $v_n$ is the measurement noise which is assumed to be zero mean Gaussian white noise with covariance $R_n=E[v_n v_n^T]$, and to the two-state dynamic model defined by:

$$\begin{bmatrix} \theta_n \\ \alpha_n \end{bmatrix} = \begin{bmatrix} 1 & (T_{1,n}-T_{1,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix}$$

wherein: $T_{1,n}$ and $T_{1,n-1}$ are timestamps at points n and n−1 respectively; and $w_n^T=[w_{\theta,n}\ w_{\alpha,n}]$ is a process noise vector which is assumed to be drawn from a zero mean normal distribution with covariance $Q_n=E[w_n w_n^T]$.

By estimating the offset and the skew of the local clock, an accurate estimate of the master clock can be arrived at. Preferably the control unit is further arranged to adjust the output of the local clock by applying the estimated offset and skew to produce a clock output that is synchronised with the master clock.

Preferably the local clock includes a free-running oscillator which supplies pulses to a free-running counter.

The recursive estimation employs a Kalman filter process in the control unit. As a Kalman filter works using a "predict phase" in which the current state of the system is predicted and an "update phase" when the predicted system state is updated based on the latest information provided, the Kalman filter operates recursively and only the last estimate of each of the offset and skew are required in order to calculate the current estimated values. This reduces the complexity and calculation cost of the estimation compared to a method in which historical data is required to provide an estimate of the current values (such as a least squares approach). However, because each estimate can effectively include the estimation based on previous inputs and measurements, the estimate produced can be very accurate.

A Kalman filter typically averages a prediction of a system's state with a new measurement using a weighted average. The weights are assigned in such a way that values with better (i.e. smaller) estimate uncertainty are considered more "trusted". The result of the weighted average can therefore be a new state that lies between the predicted and the measured state and has a better estimated uncertainty than either of these values alone.

The messages used to transmit timestamps from the time server are IEEE 1588 PTP messages. The PTP provides a protocol under which a standard message exchange is conducted between a master and a slave clock. The use of PTP means that the time client can operate in conjunction with any time server which is operating using PTP, without any changes to the time server being needed, as the estimation can be carried out locally in the time client based on the timestamps received in the standard PTP messages.

Under the IEEE 1588 PTP, message exchanges are performed regularly between server and client. The control unit is preferably further arranged to repeatedly estimate the offset and skew on a periodic basis, for example every time a particular message (such as a Sync message) is received, or after a predetermined number of messages have been received.

Embodiments of this second aspect may include some, all or none of the above described optional or preferred features.

At its broadest, a third aspect of the present invention provides a networked time system including a server-client relationship in which the client is able to estimate the offset and skew of its local clock using a recursive estimation technique.

Accordingly a third aspect of the present invention preferably provides a networked time system including a time server and at least one time client connected to the time server over a network, wherein: the time server includes a master clock and transmits Sync and Delay_Req messages under IEEE 1588 PTP carrying timestamps from the master clock; the time client includes a local clock and a control unit, wherein the control unit is arranged to receive the messages carrying timestamps from the time server and to record the time of receipt of those messages according to the local clock and to extract the timestamps, and to perform a recursive estimation using a Kalman filter process based on the extracted timestamps and the output of the local clock to estimate the offset and skew of the local clock compared to a clock in the time server, wherein the Kalman filter is applied to: the measurement equation: $(T_{2,n}-T_{1,n})-(T_{4,n}-T_{3,n})=2\theta_n+\alpha_n(T_{1,n}+T_{4,n})+v_n$, wherein: $\theta_n$ and $\alpha_n$ are respectively the offset and the skew of the local clock at point n, $T_{1,n}$ is the timestamp applied by the time server to the nth Sync message; $T_{2,n}$ is the time of receipt as recorded by the local clock on receipt of the nth Sync message; $T_{3,n}$ is the timestamp applied by the time client to the nth Delay_Req message; $T_{4,n}$ is the time of receipt as recorded by the master clock on receipt of the nth Delay_Req message; and $v_n$ is the measurement noise which is assumed to be zero mean Gaussian white noise with covariance $R_n=E[v_n v_n^T]$, and to the two-state dynamic model defined by:

$$\begin{bmatrix} \theta_n \\ \alpha_n \end{bmatrix} = \begin{bmatrix} 1 & (T_{1,n}-T_{1,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix}$$

wherein: $T_{1,n}$ and $T_{1,n-1}$ are timestamps at points n and n−1 respectively; and $w_n^T=[w_{\theta,n}\ w_{\alpha,n}]$ is a process noise vector which is assumed to be drawn from a zero mean normal distribution with covariance $Q_n=E[w_n w_n^T]$.

By estimating the offset and the skew of the local clock, an accurate estimate of the master clock can be arrived at. Preferably the control unit is further arranged to adjust the output of the local clock by applying the estimated offset and skew to produce a clock output that is synchronised with the master clock.

Preferably the local clock includes a free-running oscillator which supplies pulses to a free-running counter.

The recursive estimation employs a Kalman filter process in the control unit. As a Kalman filter works using a "predict phase" in which the current state of the system is predicted and an "update phase" when the predicted system state is updated based on the latest information provided, the Kalman filter operates recursively and only the last estimate of each of the offset and skew are required in order to calculate the current estimated values. This reduces the complexity and calculation cost of the estimation compared to a method in which historical data is required to provide an estimate of the current values (such as a least squares approach). However, because each estimate can effectively include the estimation based on previous inputs and measurements, the estimate produced can be very accurate.

A Kalman filter typically averages a prediction of a system's state with a new measurement using a weighted average. The weights are assigned in such a way that values with better (i.e. smaller) estimate uncertainty are considered more "trusted". The result of the weighted average can therefore be a new state that lies between the predicted and the measured state and has a better estimated uncertainty than either of these values alone.

The messages used to transmit timestamps from the time server are IEEE 1588 PTP messages. The PTP provides a protocol under which a standard message exchange is conducted between a master and a slave clock. The use of PTP means that the time client can operate in conjunction with any time server which is operating using PTP, without any changes to the time server being needed, as the estimation can be carried out locally in the time client based on the timestamps received in the standard PTP messages.

Under the IEEE 1588 PTP, message exchanges are performed regularly between server and client. The control unit is preferably further arranged to repeatedly estimate the offset and skew on a periodic basis, for example every time a particular message (such as a Sync message) is received, or after a predetermined number of messages have been received.

Embodiments of this third aspect may include some, all or none of the above described optional or preferred features.

Figure 2A:
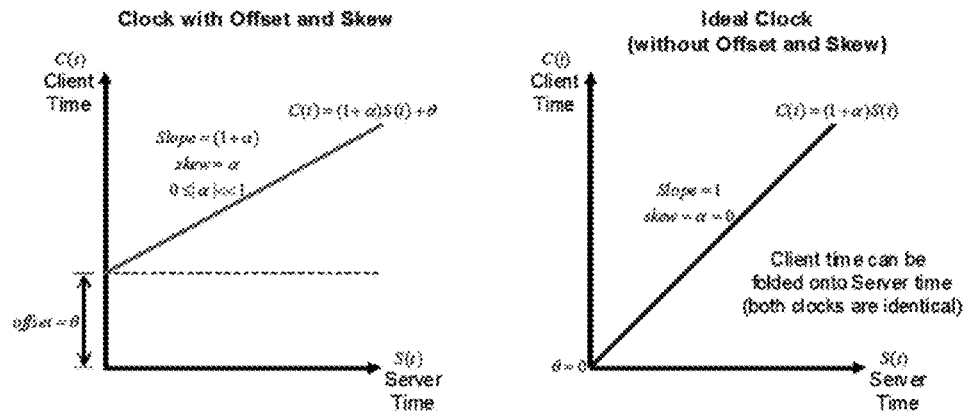
FIGS. 2a and 2b illustrate two variants of the common linear clock models used in clock synchronization analysis.
Figure 2B:
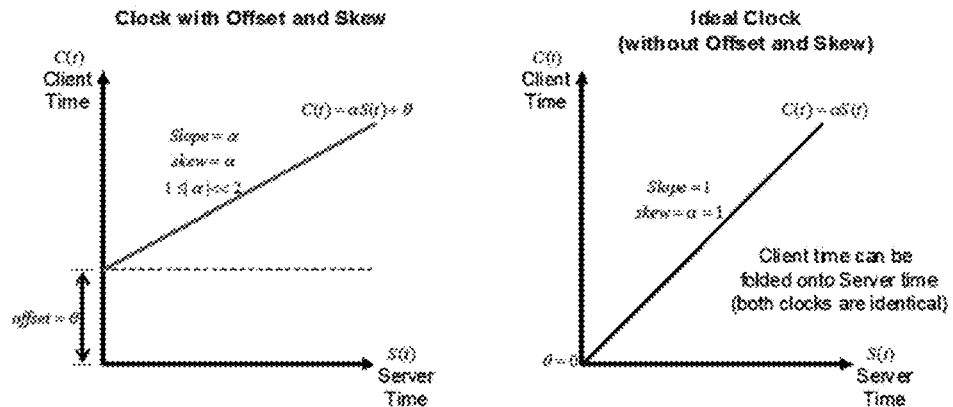

FIGS. 2a & 2b illustrate two variants of the common linear clock models used in clock synchronization analysis. In FIG. 2a, $\alpha$ is a very small number expressed in parts per million (ppm) or parts per billion (ppb). In FIG. 2b, the fractional part of $\alpha$ (i.e. $\alpha-1$) is also a very small number expressed in ppm or ppb.

Figure 3:
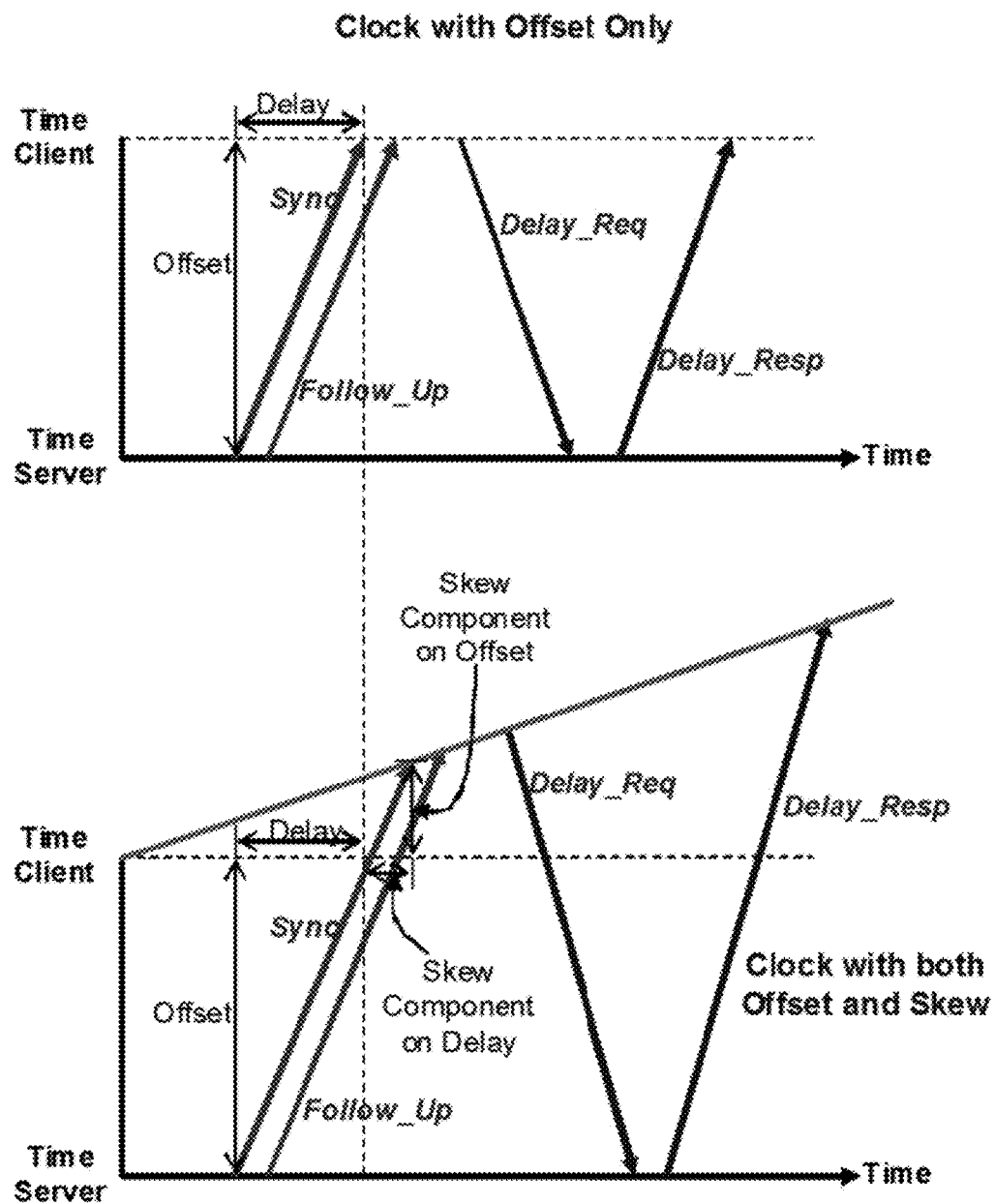
FIG. 3 shows the extension of the basic IEEE 1588 PTP protocol message exchange timing diagram to cover the case where clock offset and skew exists between the client and the server.

FIG. 3 extends the basic IEEE 1588 PTP protocol message exchange timing diagram (e.g. as illustrated in FIG. 1 and described above) to cover the case where clock offset and skew exists between the client and the server. FIG. 3 highlights the various contributions the clock skew makes on the clock offset and system delay as shown in the lower diagram compared to the upper diagram in which the clock demonstrates offset only. The two figures in FIG. 3 become identical when there is zero skew between the clocks.

Figure 4:
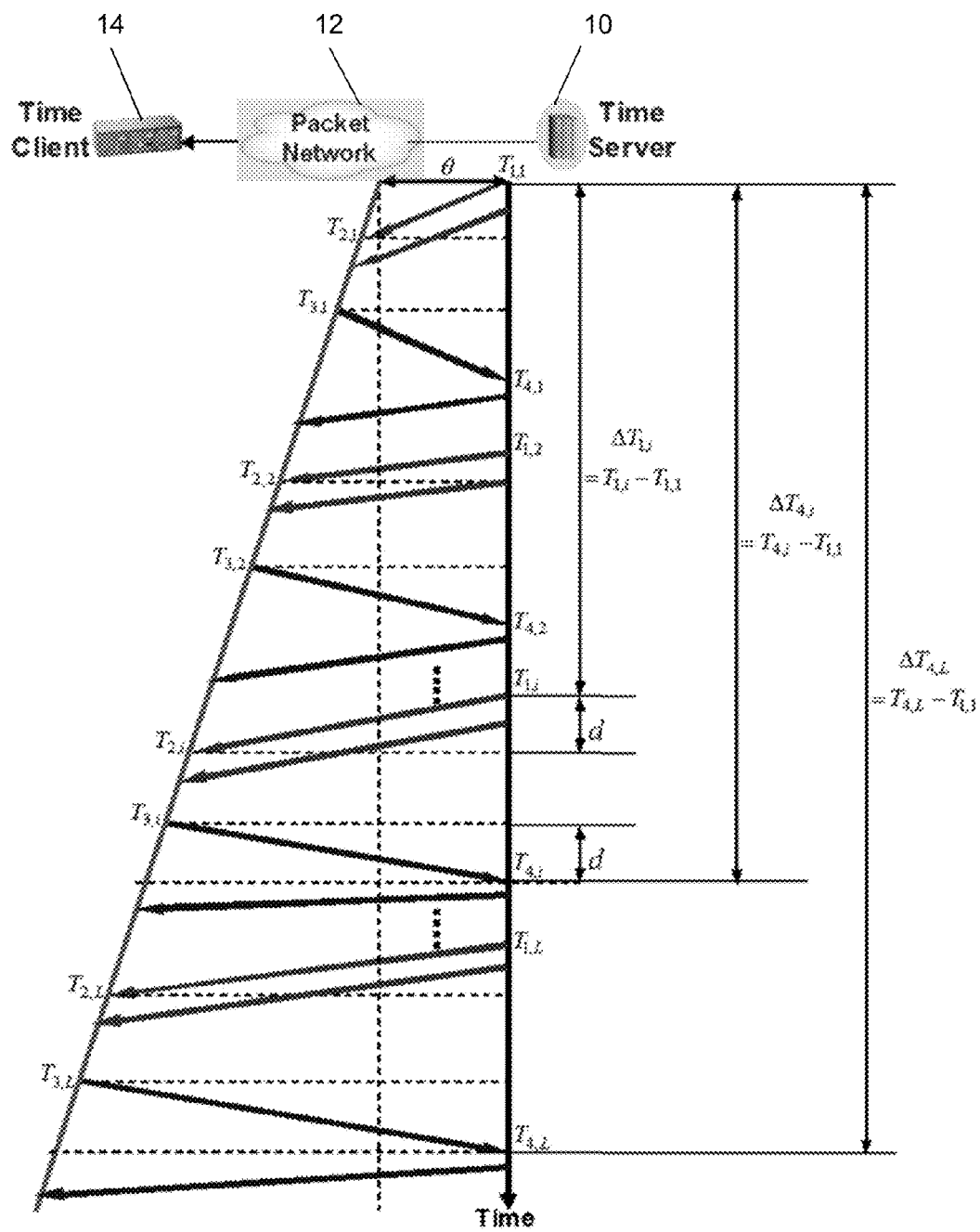
FIG. 4 shows a clock model derived from a combination of FIGS. 3 and 4.

Using the clock models in FIG. 2 and FIG. 3, the model in FIG. 4 can be obtained. Since no two clock oscillators will run at exactly the same frequency, there will always be a clock skew and the two clocks will have an increasing or decreasing clock offset.

Figure 5:
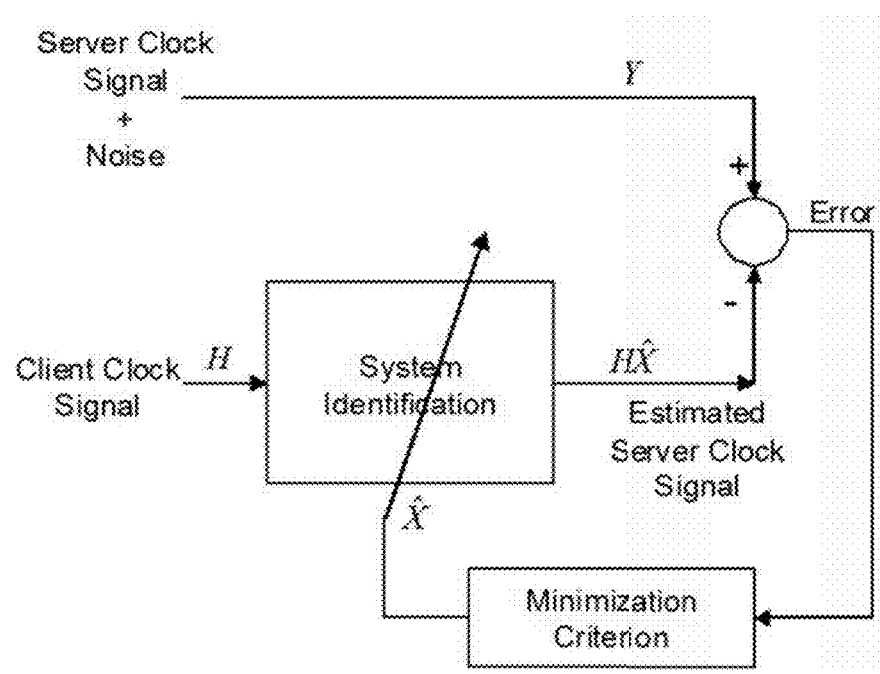
FIG. 5 shows the clock synchronisation problem solved in embodiments of the present invention as a system identification problem.
Figure 6:
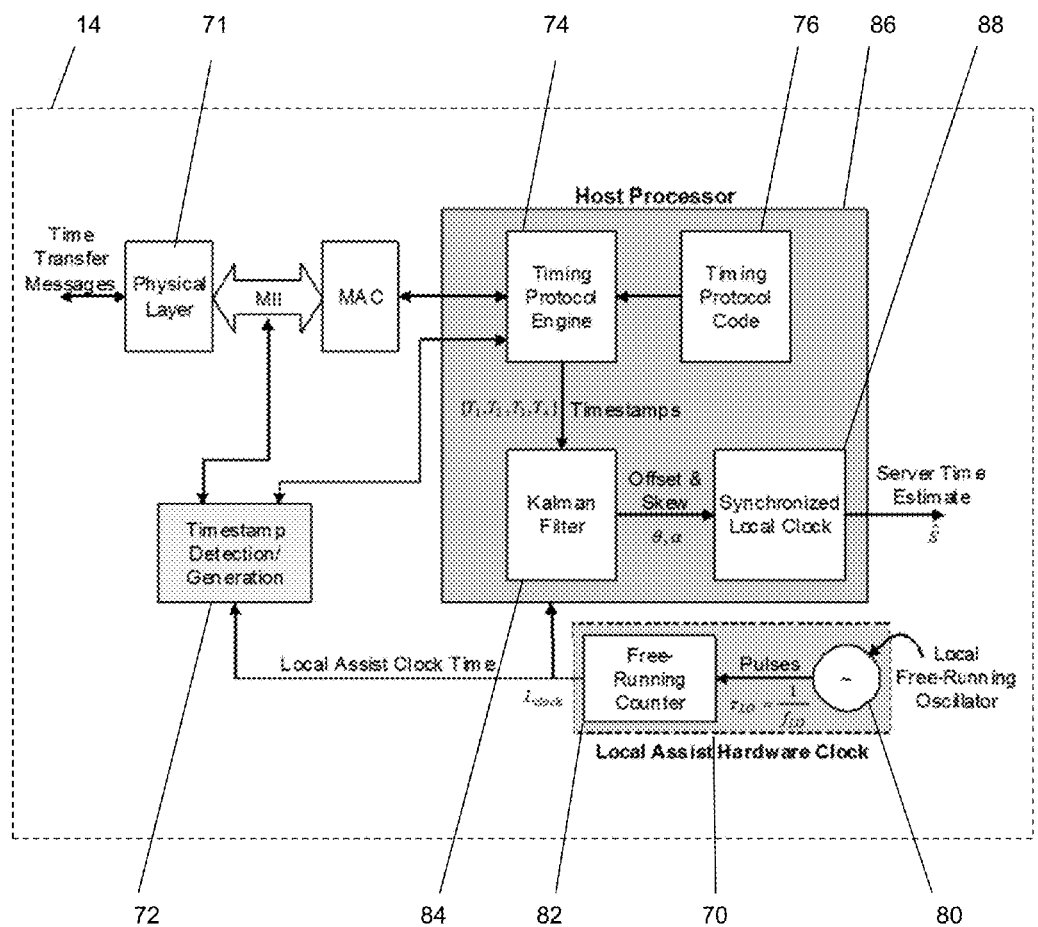
FIG. 6 shows the architecture of a time client according to an embodiment of the present invention.

The techniques proposed in the following embodiments of the present invention assume that a free-running local clock is used at the time client 14. In this case, the frequency of the client's local oscillator is not adjusted, but it is allowed to free-run. The timestamps indicated in FIG. 5 at the client are with respect to this local clock. Timestamps at the client are captured according to the client's free running local oscillator as depicted in FIG. 6.

From the clock models given in FIGS. 2 to 4, we get the following relationships can be obtained from the ith Sync and Follow_Up messages:

$$\begin{aligned} T_{2,i} &= (T_{1,i} + d) + \text{offset} + \alpha(\text{elapse time}) \\ &= (T_{1,i} + d) + \theta_R + \alpha \cdot \Delta T_{1,i} \\ &= (T_{1,i} + d) + \theta_R + \alpha(T_{1,i} - T_{1,1} + d) \\ &= (T_{1,i} + d) + \theta + \alpha(T_{1,i} + d) \end{aligned} \quad (5)$$

The term $\theta=(\theta_R - \alpha T_{1,1})$ denotes the initial reference offset that has to be estimated so that the client can align its clock to that of the server. From the ith Delay_Req and Delay_Resp messages, we get the following relationships:

$$\begin{aligned} T_{3,i} &= (T_{4,i} - d) + \text{offset} + \alpha(\text{elapse time}) \\ &= (T_{4,i} - d) + \theta_R + \alpha \cdot \Delta T_{4,i} \\ &= (T_{4,i} - d) + \theta_R + \alpha(T_{4,i} - T_{1,1} - d) \\ &= (T_{4,i} - d) + \theta + \alpha(T_{4,i} - d) \end{aligned} \quad (6)$$

Note that setting $\alpha=0$ (that is for a system with no skew and offset only), we get the set of equations obtained earlier on from FIG. 2.

If we assume that all protocol message undergo the same amount of fixed delay (in both directions), then we can add (5) to (6) to obtain $$(T_{2,i}+T_{3,i})=(T_{1,i}+T_{4,i})+2\theta+\alpha(T_{1,i}+T_{4,i})$$

$$(T_{2,i}-T_{1,i})-(T_{4,i}-T_{3,i})=2\theta+\alpha(T_{1,i}+T_{4,i}) \quad (7)$$

The above timestamp values are affected by measurement uncertainties mainly in the form of timestamping uncertainties (of the server and client clocks) and asymmetry of the propagation delay between server and client clocks.

Now incorporating the notion of measurement uncertainties in the above formulation, we can form a matrix from N observations as follows:

$$\begin{bmatrix} (T_{2,1} - T_{1,1}) - (T_{4,1} - T_{3,1}) \\ \vdots \\ (T_{2,N} - T_{1,N}) - (T_{4,N} - T_{3,N}) \end{bmatrix} = \begin{bmatrix} 2 & T_{1,1} + T_{4,1} \\ \vdots & \vdots \\ 2 & T_{1,N} + T_{4,N} \end{bmatrix} \begin{bmatrix} \theta \\ \alpha \end{bmatrix} + \begin{bmatrix} v_1 \\ \vdots \\ v_N \end{bmatrix} \quad (8)$$

Let us define the following vectors and matrices:

$$Y = \begin{bmatrix} (T_{2,1} - T_{1,1}) - (T_{4,1} - T_{3,1}) \\ \vdots \\ (T_{2,N} - T_{1,N}) - (T_{4,N} - T_{3,N}) \end{bmatrix},$$

$$H = \begin{bmatrix} 2 & T_{1,1} + T_{4,1} \\ \vdots & \vdots \\ 2 & T_{1,N} + T_{4,N} \end{bmatrix}, X = \begin{bmatrix} \theta \\ \alpha \end{bmatrix}, \text{and } V = \begin{bmatrix} v_1 \\ \vdots \\ v_N \end{bmatrix}$$

Equation (8) can then be written as $$Y=HX+V \quad (9)$$

In the above equation, X is a 2-dimensional state (or parameter) vector, H is a N×2-dimensional measurement matrix, V is an N-dimensional zero mean white measurement noise vector, and Y is the an N-dimensional measured output vector.

In the above, we consider a model where a transmitter feeds a periodic message stream of timestamps into the network. The network distorts the source message stream and delivers an aperiodic message stream to the receiver because each message experiences a varying amount of time delay in the network; the message stream is corrupted by network delay variations (network jitter). The problem is to estimate the clock offset θ and skew α from message departure and arrival time measurements.

Recursive Estimation

The model used in embodiments of the present invention is based on state-space representations of the variables being estimated. The state-space formulation implies that, at each point in time, the process being modeled is described by a vector of state variables that summarize all relevant quantities of interest. The filtering algorithm to be described below uses this model of the time behavior of the system along with noisy observations or measurements of some system variables to produce optimal estimates of all state variables. These estimates are then used in the process model to determine state estimates for future time periods.

From (9), X is the 2-dimensional vector to be estimated. In least-square (LS) estimation [28][29], the problem is to find an estimate $\hat{X}$ of the vector X as a linear combination of the measurements Y so that the estimate $\hat{X}$ minimizes the following cost function:

$$J(\hat{X}) = (Y - H\hat{X})^T (Y - H\hat{X}), \quad (10)$$

where T denotes transpose. FIG. 5 illustrates this relationship schematically.

The solution to this problem, $\partial J/\partial \hat{X} = 0$, can be expressed as $$\hat{X} = (H^T H)^{-1} H^T Y, \quad (11)$$

which is an unbiased estimate of X [30].

Having a bigger window N leads to a better estimate $\hat{X}$, however, solving (11) can be computationally expensive for large N mainly because of the matrix inversion that has to be performed each time.

The least square solution (11) requires a large number of timestamp measurements (thus, storage requirements) in order to generate accurate clock parameter estimates. Below we describe an alternate technique based on Kalman filtering [28][29] that has much less storage requirements for data samples yet provides very good estimates of the clock parameters.

Filtering is desirable in many applications in engineering, technology and econometrics. For example, communication signals are often corrupted with noise (random variations) and other inaccuracies, and a good filtering algorithm can be used to remove the noise from the signals while retaining useful information. The Kalman filter is a practical tool that can estimate the variables of a wide range of processes it can be used to estimate the state of a linear system. It can be shown that of all possible filters [28][29], the Kalman filter is the one that minimizes the variance of the estimation error. Below, we show how the Kalman filter can be used to estimate recursively the parameters of the clock synchronization problem described above.

The Kalman filter allows us to use measurements of a process observed over time, containing noise and other inaccuracies, and produce values (estimates) that tend to be closer to the true values of the measurements and their associated calculated values. The Kalman filter produces estimates of the true values of measurements and their associated calculated values by doing the following:
  predicting a value,
  estimating the uncertainty of the predicted value, and
  computing a weighted average of the predicted value and the measured value.

The above method involves assigning the most weight to the value with the least uncertainty. The estimates produced by the method tend to be closer to the true values than the original measurements because the weighted average has a better estimated uncertainty than either of the values that went into the weighted average.

The underlying understanding in using a filtering technique is that all measurements and calculations based on models are estimates to some degree. The Kalman filter uses a system's dynamics model, known control inputs to that system, and measurements to form an estimate of the system's varying quantities (its state) that is better than the estimate obtained by using any one measurement alone.

In order to use the Kalman filter (to estimate the internal state of a process given only a sequence of noisy observations), we must model the process in accordance with the framework of the Kalman filter.

Firstly we consider a state-space model described by the following pair of equations:

$$X_n = A_n X_{n-1} + w_n, \quad (12)$$

$$y_n = D_n X_n + v_n, \quad (13)$$

where n is a nonnegative time index, $A_n$ is a known M-by-M state transition matrix, $X_n$ is the M-dimensional state (or parameter) vector, $w_n$ is an M-dimensional process noise vector which is assumed to be drawn from a zero mean multivariate normal distribution with covariance $Q_n = E[w_n w_n^T]$, $w_n \sim N(0, Q_n)$, $y_n$ is the measurement, $D_n$ is a known 1×M-dimensional measurement matrix which maps the true state space into the measurement space, $v_n$ is the measurement noise which is assumed to be zero mean Gaussian white noise with covariance $R_n = E[v_n v_n^T]$, $v_n \sim N(0, R_n)$, and T denotes transpose. It is assumed in the model that the initial state, and the noise vectors at each step $\{X_0, w_1, \ldots, w_n, v_1, \ldots, v_n\}$ are mutually independent.

The Kalman filter is a recursive estimator which means that only the estimated state from the previous time step and the current measurement are needed to compute the estimate for the current state. In contrast to the batch estimation technique in (11), no history of observations and/or estimates is required. The notation $\hat{X}_{n,m}$ used below represents the estimate of X at time n given observations up to, and including at time m.

There are many alternative but equivalent ways to express the Kalman filter equations. However it is most often conceptualized as two distinct phases: Predict and Update as described below.

Predict Phase

The predict phase uses the state estimate from the previous time step to produce an estimate of the state at the current time step.

Predicted (a priori) state estimate:

$$\hat{X}_{n,n-1} = A_n \hat{X}_{n-1,n-1} \quad (14)$$

This predicted state estimate is also known as the a priori state estimate because, although it is an estimate of the state at the current time step, it does not include observation information from the current time step.

Predicted (a priori) estimate covariance:

$$P_{n,n-1} = A_n P_{n-1,n-1} A_n^T + Q_n \quad (15)$$

Update Phase

In the update phase, the current a priori prediction is combined with current observation information to refine the state estimate. This improved estimate is termed the a posteriori state estimate.

Innovation or measurement residual:

$$\tilde{z}_n = y_n - D_n \hat{X}_{n,n-1} \quad (16)$$

Innovation (or residual) covariance:

$$S_n = D_n P_{n,n-1} D_n^T + R_n \quad (17)$$

Optimal Kalman Gain:

$$K_n = P_{n,n-1} D_n^T S_n^{-1} = P_{n,n-1} D_n^T [D_n P_{n,n-1} D_n^T + R_n]^{-1} \quad (18)$$

Updated (a posteriori) state estimate:

$$\hat{X}_{n,n} = \hat{X}_{n,n-1} + K_n \tilde{z}_n = \hat{X}_{n,n-1} + K_n (y_n - D_n \hat{X}_{n,n-1}) \quad (19)$$

This is the a posteriori state estimate at time n given observations up to and including at time n. The second term in the above equation is called the correction term and it represents the amount by which to correct the propagated state estimate due to our measurement. Inspection of the Kalman gain equation shows that if the measurement noise is large, $R_n$ will be large, so that $K_n$ will be small and we would not give much credibility to the measurement y when computing the next $\hat{X}$. On the other hand, if the measurement noise is small, $R_n$ will be small, so that $K_n$ will be large and we will give a lot of credibility to the measurement when computing the next $\hat{X}$.

Updated (a posteriori) estimate covariance:

$$P_{n,n} = (I - K_n D_n) P_{n,n-1} \quad (20)$$

This is the a posteriori error covariance matrix (a measure of the estimated accuracy of the state estimate).

Typically, the two phases alternate, with the prediction advancing the state until the next scheduled observation, and the update incorporating the observation. Practical implementation of the Kalman Filter requires getting a good estimate of the noise covariance matrices $Q_n$ and $R_n$.

As discussed above the Kalman filter averages a prediction of a system's state with a new measurement using a weighted average. The weights are assigned in such a way that values with better (i.e., smaller) estimated uncertainty are "trusted" more. The weights are calculated from the covariance, a measure of the estimated uncertainty of the prediction of the system's state. The result of the weighted average is a new state estimate that lies in between the predicted and measured state, and has a better estimated uncertainty than either alone. This process is repeated every time step, with the new estimate and its covariance informing the prediction used in the following iteration. With this the Kalman filter works recursively and requires only the last "best guess" and not the entire history of a system's state to calculate a new state.

Clock State Estimation Algorithm

The measurement equation derived in (7) can be written as $$(T_{2,n} - T_{1,n}) - (T_{4,n} - T_{3,n}) = 2\theta_n + \alpha_n (T_{1,n} + T_{4,n}) \quad (21)$$

from which we get the output equation $y_n = D_n X_n + v_n$ in (13), where n is a non-negative time index, $y_n = (T_{2,n} - T_{1,n}) - (T_{4,n} - T_{3,n})$, $X_n^T = [\theta_n \ \alpha_n]$, $D_n = [2 \ T_{1,n} + T_{4,n}]$ and $v_n$ is the measurement noise which is assumed to be zero mean Gaussian white noise with covariance $R_n = E[v_n v_n^T]$.

Now it is easy to see that given two clock offsets $\theta_n$ and $\theta_{n-1}$, the clock skew between the two points $T_{1,n}$ and $T_{1,n-1}$ can be estimated as $$\alpha_{n-1} = \frac{\theta_n - \theta_{n-1}}{T_{1,n} - T_{1,n-1}}. \quad (22)$$

Accounting for measurement uncertainties in (22), we get the following update equations for the clock offset and skew $$\theta_n = \theta_{n-1} + \alpha_{n-1}(T_{1,n} - T_{1,n-1}) + w_{\theta,n}$$

$$\alpha_n = \alpha_{n-1} + w_{\alpha,n} \quad (23)$$

where $w_n^T = [w_{\theta,n} \ w_{\alpha,n}]$ is a process noise vector which is assumed to be drawn from a zero mean normal distribution with covariance $Q_n = E[w_n w_n^T]$. The system can be described by the following two-state dynamic model $$X_n = \begin{bmatrix} \theta_n \\ \alpha_n \end{bmatrix} = \begin{bmatrix} 1 & (T_{1,n} - T_{1,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix} = AX_{n-1} + w_n, \quad (24)$$

where $A_n$ is the known 2-by-2 state transition matrix. With the measurement equation (21) and state equation (24) fully described, the main elements for using the Kalman filter are now available.

The idea of using the Kalman filter can be summarised as follows. The vector X contains all of the information about the present state of the system, but we cannot measure X directly. Instead we measure y, which is a function of X that is corrupted by the noise v. The Kalman filter allows us to use y to obtain an accurate estimate of the true state even though we cannot measure it directly.

The clock offset and skew can be calculated by the client after each Sync message broadcast by the server or after multiple periods of the Sync message broadcast (the period between Sync messages could serve as sampling period of the system). Typically, in IEEE PTP, the time between Sync messages is fixed, resulting in, $\Delta T_n = (T_{1,n} - T_{1,n-1}) = \Delta T$ in (24).

FIG. 6 shows the main blocks of the synchronization technique according to an embodiment of the present invention at a time client 14. The free running local oscillator is used together with the estimated clock parameters to synthesize a synchronized local clock which is an estimated image of the server clock.

Time transfer messages according to PTP are received from the network (not shown) by the physical layer 71 of the network adapter. The host processor 86 of the time client stores the code 76 for operating a timing protocol engine 74 which feeds to a timestamp detection/generation unit 72 which, in conjunction with the output of the local clock 70, detects timestamps on incoming messages (Sync, Follow-Up, Delay Resp) and applies timestamps to outgoing messages (Delay_Req.).

The local clock 70 is made up of a free-running oscillator 80 which produces pulses at a set frequency which are supplied to a local free-running counter 82.

The timestamps taken from the incoming messages are fed to the Kalman filter unit 84 which uses these and the inputs from the local clock 70 to determine the offset and skew of the local clock as described and thereby produces a synchronised local clock output 88.

From FIG. 2a (clock model 1), the client time C(t) is expressed as:

$$C(t) = (1+\alpha)S(t) + \theta$$

Figure 7:
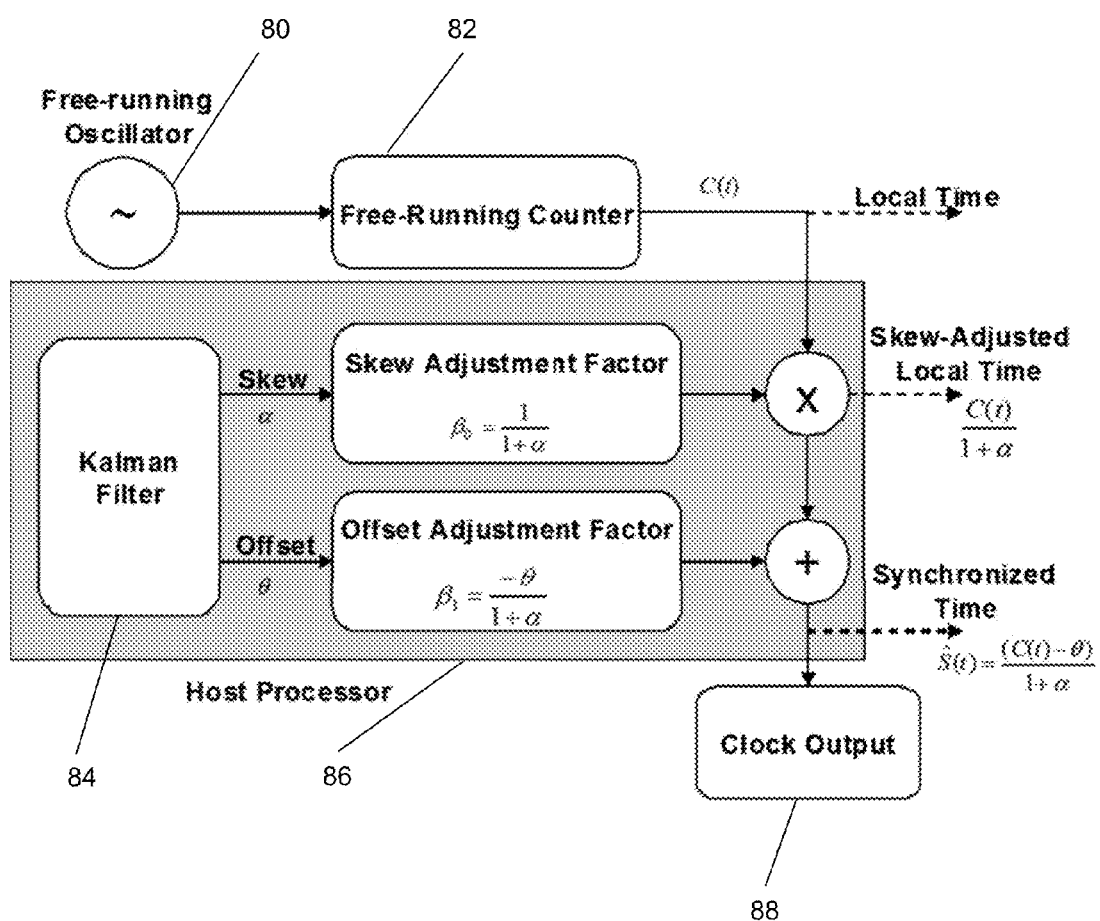
FIG. 7 shows the adjustments made to a free-running local clock to produce a synchronised clock output.

Using this model and the estimated clock skew and offset parameters $\beta_0=1/(1+\alpha)$ and $\beta_1=-\theta/(1+\alpha)$, respectively, the client can align its clock to the server's as illustrated in FIG. 7.

FIG. 7 shows how the local time C(t) produced by the local free running oscillator 80 and the free-running counter 82 is adjusted by the skew $\alpha$ and the offset $\theta$ produced by the Kalman filter 84 running on the processor 86 of the client to produce a clock output 88 which is a synchronized time with the master clock (not shown).

Implementation

The systems and methods of the above embodiments may be implemented at least partly in a computer system (in particular in computer hardware or in computer software) in addition to the structural components and user interactions described.

The term "computer system" includes the hardware, software and data storage devices for embodying a system or carrying out a method according to the above described embodiments. For example, a computer system may comprise a central processing unit (CPU), input means, output means and data storage. The data storage may comprise RAM, disk drives or other computer readable media. The computer system may include a plurality of computing devices connected by a network and able to communicate with each other over that network.

The methods of the above embodiments may be provided as one or more computer programs or as computer program products or computer readable media carrying a computer program which is arranged, when run on a computer, to perform the method(s) described above.

The term "computer readable media" includes, without limitation, any medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

In particular, although the methods of the above embodiments have been described as being implemented on the systems of the embodiments described, the methods and systems of the present invention need not be implemented in conjunction with each other, but can be implemented on alternative systems or using alternative methods respectively.

REFERENCES

[1]. IEEE Standard for a Precision Clock Synchronization Protocol for Networked Measurement and Control Systems, IEEE 1588-2008.
[2]. IEEE Standard for a Precision Clock Synchronization Protocol for Networked Measurement and Control Systems, IEEE 1588-2002.
[3]. Mills, D., "Network Time Protocol (Version 3) Specification, Implementation and Analysis", *IETF RFC* 1305, March 1992.
[4]. R. Holler, T. Saulter, N. Kero, "Embedded SynUTC and IEEE 1588 clock synchronization for industrial Ethernet," in *Proc. IEEE Emerging Technologies and Factory Automation*, vol. 1, pp. 422-426, November 2003.
[5]. O. Gurewitz, I. Cidon and M. Sidi, "Network time synchronization using clock offset optimization," in *Proc. IEEE Intl Conf on Network Protocols*, pp. 212-221, November 2003.
[6]. R. Subrahmanyan, "Timing recovery for IEEE 1588 applications in telecommunications," *IEEE Transactions on Inst. And Meas.*, vol. 58, no. 6, pp. 1858-1868, June 2009.
[7]. I. Hadzic, D.R. Morgan and Z. Sayeed, "A synchronization algorithm for packet MANs," *IEEE Transactions on Communications*, vol. 59, no. 4, pp. 1142-1153, April 2011.
[8]. V. Paxon, *Measurements and Analysis of End-to-End Internet Dynamics*, Ph.D. Thesis, University of California, Berkeley, 1997.
[9]. R. Ravikanth, Nokia Telecommunications Inc. (2001), Method for estimating relative skew between clocks in packet network, U.S. Pat. No. 6,327,274.
[10]. S. B. Moon, P. Skelly and D. Towsley, "Estimation and removal of clock skew from network delay measurements," in *Proc. IEEE INFOCOM*, vol. 1, pp. 227-234, New York, N.Y., USA, March 1999.
[11]. P. Skelly, S. B. Moon, D. Towsley, Verizon Laboratories Inc. (2003), Clock skew estimation and removal, U.S. Pat. No. 6,661,810.
[12]. L. Zhang, Z. Liu and C. H. Xia, "Clock synchronization algorithms for network measurements," in *Proc. IEEE INFOCOM*, vol. 1, pp. 160-169, November 2002.
[13]. Z. Liu, C. H. Xia, L. Zhang, International Business Machines Corporation (2005), Clock synchronization with removal of clock skews through network measurements in derivation of a convex hull, U.S. Pat. No. 6,957,357.
[14]. S. M. Carlson, M. H. T. Hack and L. Zhang, International Business Machines Corporation (2010), Method and system for clock skew and offset estimation, U.S. Pat. No. 7,688,865.
[15]. J. Benesty, Lucent Technologies Inc. (2006), Method for estimating clock skew within a communications network, U.S. Pat. No. 7,051,246.
[16]. A. Bletsas, "Evaluation of Kalman filtering for network time keeping," *IEEE Transactions on Ultrasonics, Ferroelectrics and Frequency Control*, vol. 52, no. 9, pp. 1452-1460, September 2005.
[17]. K. M. Lindskog and J. K. Osterling, Telefonaktiebolaget LM Ericsson (2006), Synchronization of nodes, U.S. Pat. No. 7,103,124.
[18]. L. F. Auler and R. d'Amore, "Adaptive Kalman Filter for time synchronization over packet-switched networks an heuristic approach," in *Proc. 2nd Conf. on Communication Systems Software and Middleware*, pp. 1-7, Bangalore, January 2007.
[19]. H. Abubakari and S. Sastry, "IEEE 1588 style synchronization over wireless link," in *Proc. IEEE ISPCS*, Ann Arbor, Mich., pp. 127-130, September 2008.
[20]. F. Kirsch, P. Gulden and M. Vossiek, Circuit arrangement and method for synchronization of clocks in a network, U.S. patent application Ser. No. 12/390,586.
[21]. L. P.-Studencka, A. Eidloth and J. Thielecke, Method and apparatus for estimating clock deviations, for virtual synchronization of free-running clocks and for determining the position of a movable object, U.S. patent application Ser. No. 12/725,276.

[22]. Z. Yang, J. Pan, L. Cai, "Adaptive clock skew estimation with interactive multi-modal Kalman filters for sensor networks," in *Proc. IEEE Intl Conf on Commun. (ICC)*, pp. 1-5, Cape Town, South Africa, May 2010.

[23]. B. S. R. Armstrong, L. R. Pereira and C. H. Rentel, Eaton Corporation (2011), Synchronization system and method for wireless communicating nodes, U.S. Pat. No. 7,912,164.

[24]. G. Giorgi and C. Narduzzi, "Performance analysis of Kalman-Filter-Based clock synchronization in IEEE 1588 networks," *IEEE Transactions on Instrumentation and Measurement*, vol. 60, no. 8, pp. 2902-2909, August 2011.

[25]. H. Kim, X. Ma, B.R. Hamilton, "Tracking low-precision clocks with time-varying drifts using Kalman filtering," *IEEE/ACM Transactions on Networking*, vol. 99, June 2011.

[26]. P. Wolfrum, R. L. Scheiterer, and D. Obradovic, "An Optimal Control Approach to Clock Synchronization," ISPCS 2010, 27 Sep. 1-Oct. 2010 pp. 122-128.

[27]. D. Fontanelli and D. Macii, "Accurate Time Synchronization in PTP-based Industrial Networks with Long Linear Paths," ISPCS 2010, 27 Sep. 1-Oct. 2010 pp. 97-102.

[28]. S. Haykin, *Adaptive Filter Theory*, Englewood Cliffs, N.J., Prentice-Hall, 1991.

[29]. L. Ljung and T. Soderstrom, *Theory and Practice of Recursive Identification*, Cambridge, Mass.: MIT Press, 1987.

[30]. J. L. Melsa and D. L. Cohn, *Decision and Estimation Theory*, McGraw-Hill, 1978.

All references referred to are hereby incorporated by reference.

The invention claimed is:

1. A method of estimating the offset and skew of a local clock in a time client compared with a remote master clock in a time server, the method including the steps of:

transmitting Sync and Delay Req messages under the IEEE 1588 PTP, carrying timestamps from the time server;

receiving said messages at the time client and recording the time of receipt according to the local clock and extracting said timestamps; and performing a recursive estimation using a Kalman filter process based on the extracted timestamps and the output of the local clock to estimate the offset and skew of the local clock compared to the master clock, wherein the Kalman filter is applied to:

the measurement equation:

$$(T_{2,n} - T_{1,n}) - (T_{4,n} - T_{3,n}) = 2\theta_n + \alpha_n(T_{1,n} + T_{4,n}) + v_n$$

wherein:

$\theta_n$ and $\alpha_n$ are respectively the offset and the skew of the local clock at point n, $T_{1,n}$ is the timestamp applied by the time server to the nth Sync message;

$T_{2,n}$ is the time of receipt as recorded by the local clock on receipt of the nth Sync message;

$T_{3,n}$ is the timestamp applied by the time client to the nth Delay Req message;

$T_{4,n}$ is the time of receipt as recorded by the master clock on receipt of the nth Delay Req message; and $v_n$ is the measurement noise which is assumed to be zero mean Gaussian white noise with covariance $R_n = E[v_n v_n^T]$, and to the two-state dynamic model defined by:

$$\begin{bmatrix} \theta_n \\ \alpha_n \end{bmatrix} = \begin{bmatrix} 1 & (T_{1,n} - T_{1,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix}$$

wherein:

$T_{1,n}$ and $T_{1,n-1}$ are timestamps at points n and n−1 respectively; and $w_n^T = [w_{\theta,n}\ w_{\alpha,n}]$ is a process noise vector which is assumed to be drawn from a zero mean normal distribution with covariance $Q_n = E[w_n w_n^T]$.

2. A method according to claim 1 further including the step of adjusting the output of the local clock by applying the estimated offset and skew to produce a clock output that is synchronised with the master clock.

3. A method according to claim 1 further including repeatedly estimating the offset and skew on a periodic basis.

4. A time client communicably coupled to a time server over a network, the time client comprising:

a local clock; and a control unit, wherein the control unit is arranged to receive Sync and Delay Req messages under the IEEE 1588 PTP carrying timestamps from the time server and to record the time of receipt of those messages according to the local clock and extract the timestamps, and to perform a recursive estimation using a Kalman filter process based on the extracted timestamps and the output of the local clock to estimate the offset and skew of the local clock compared to a clock in the time server, wherein the Kalman filter is applied to:

the measurement equation:

$$(T_{2,n} - T_{1,n}) - (T_{4,n} - T_{3,n}) = 2\theta_n + \alpha_n(T_{1,n} + T_{4,n}) + v_n$$

wherein:

$\theta_n$ and $\alpha_n$ are respectively the offset and the skew of the local clock at point n, $T_{1,n}$ is the timestamp applied by the time server to the nth Sync message;

$T_{2,n}$ is the time of receipt as recorded by the local clock on receipt of the nth Sync message;

$T_{3,n}$ is the timestamp applied by the time client to the nth Delay Req message;

$T_{4,n}$ is the time of receipt as recorded by the master clock on receipt of the nth Delay Req message; and $v_n$ is the measurement noise which is assumed to be zero mean Gaussian white noise with covariance $R_n = E[v_n v_n^T]$, and to the two-state dynamic model defined by:

$$\begin{bmatrix} \theta_n \\ \alpha_n \end{bmatrix} = \begin{bmatrix} 1 & (T_{1,n} - T_{1,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix}$$

wherein:

$T_{1,n}$ and $T_{1,n-1}$ are timestamps at points n and n−1 respectively; and $w_n^T = [w_{\theta,n}\ w_{\alpha,n}]$ is a process noise vector which is assumed to be drawn from a zero mean normal distribution with covariance $Q_n = E[w_n w_n^T]$.

5. A time client according to claim 4 wherein the local clock includes a free-running oscillator which supplies pulses to a free-running counter.

6. A time client according to claim 4 wherein the control unit is further arranged to adjust the output of the local clock based on the estimated offset and skew.

7. A time client according to claim 6 wherein the control unit is arranged to correct the output of the local clock on a periodic basis.

8. A networked time system including a time server and at least one time client connected to the time server over a network, wherein:
the time server includes a master clock and transmits Sync and Delay Req messages under IEEE 1588 PTP carrying timestamps from the master clock;
the time client includes a local clock and a control unit,
wherein the control unit is arranged to receive the messages carrying timestamps from the time server and to record the time of receipt of those messages according to the local clock and to extract the timestamps, and to perform a recursive estimation using a Kalman filter process based on the extracted timestamps and the output of the local clock to estimate the offset and skew of the local clock compared to a clock in the time server, wherein the Kalman filter is applied to:
the measurement equation:

$$(T_{2,n} - T_{1,n}) - (T_{4,n} - T_{3,n}) = 2\theta_n + \alpha_n(T_{1,n} - T_{4,n}) + v_n$$

wherein:
$\theta_n$ and $\alpha_n$ are respectively the offset and the skew of the local clock at point n,
$T_{1,n}$ is the timestamp applied by the time server to the nth Sync message;
$T_{2,n}$ is the time of receipt as recorded by the local clock on receipt of the nth Sync message;
$T_{3,n}$ is the timestamp applied by the time client to the nth Delay Req message;
$T_{4,n}$ is the time of receipt as recorded by the master clock on receipt of the nth Delay Req message; and
$v_n$ is the measurement noise which is assumed to be zero mean Gaussian white noise with covariance $R_n = E[v_n v_n^T]$,
and to the two-state dynamic model defined by:

$$\begin{bmatrix} \theta_n \\ \alpha_n \end{bmatrix} = \begin{bmatrix} 1 & (T_{1,n} - T_{1,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix}$$

wherein:
$T_{1,n}$ and $T_{1,n-1}$ are timestamps at points n and n−1 respectively; and
$w_n^T = [w_{\theta,n} \; w_{\alpha,n}]$ is a process noise vector which is assumed to be drawn from a zero mean normal distribution with covariance $Q_n = E[w_n w_n^T]$.

9. A networked time system according to claim 8 wherein the local clock includes a free-running oscillator which supplies pulses to a free-running counter.

10. A networked time system according to claim 8 wherein the control unit is further arranged to correct the output of the local clock based on the estimated offset and skew.

11. A networked time system according to claim 10 wherein the control unit is arranged to correct the output of the local clock on a periodic basis.

* * * * *